United States Patent
Leveson

(10) Patent No.: US 7,993,599 B2
(45) Date of Patent: Aug. 9, 2011

(54) METHOD FOR ENHANCING CATALYST SELECTIVITY

(75) Inventor: Philip D. Leveson, Hannawa Falls, NY (US)

(73) Assignee: Zeropoint Clean Tech, Inc., Postsdam, NY (US)

( * ) Notice: Subject to any disclaimer, the term of this patent is extended or adjusted under 35 U.S.C. 154(b) by 0 days.

(21) Appl. No.: 11/681,518

(22) Filed: Mar. 2, 2007

(65) Prior Publication Data

US 2007/0219279 A1  Sep. 20, 2007

Related U.S. Application Data

(60) Provisional application No. 60/779,079, filed on Mar. 3, 2006.

(51) Int. Cl.
| | |
|---|---|
| *B01J 10/00* | (2006.01) |
| *B01J 10/02* | (2006.01) |
| *B01J 12/00* | (2006.01) |
| *B01J 12/02* | (2006.01) |
| *B01J 14/00* | (2006.01) |
| *B01J 15/00* | (2006.01) |
| *B01J 16/00* | (2006.01) |
| *B01J 19/00* | (2006.01) |
| *B01J 21/04* | (2006.01) |
| *B01J 23/02* | (2006.01) |

(52) U.S. Cl. .................... 422/198; 422/129; 502/439
(58) Field of Classification Search ............... 502/439; 422/129, 198–208
See application file for complete search history.

(56) References Cited

U.S. PATENT DOCUMENTS

| | | | | |
|---|---|---|---|---|
| 1,522,111 | A | * | 1/1925 | Franck-Philipson ......... 422/169 |
| 1,825,259 | A | * | 9/1931 | Brassert ......................... 432/217 |
| 1,964,830 | A | * | 7/1934 | Hans et al. ...................... 165/9.2 |
| 2,121,733 | A | * | 6/1938 | Cottrell ........................... 423/210 |
| 2,288,943 | A | * | 7/1942 | Eastman ......................... 422/171 |
| 2,512,608 | A | | 6/1950 | Buchmann |
| 3,134,584 | A | * | 5/1964 | Agnew ............................ 165/9.3 |

(Continued)

FOREIGN PATENT DOCUMENTS

GB  2 366 611  3/2002

OTHER PUBLICATIONS

Search Report and Written Opinion; International Patent Application No. PCT/US2007/063249; Jun. 16, 2008.

*Primary Examiner* — Stanley Silverman
*Assistant Examiner* — Anthony J Zimmer
(74) *Attorney, Agent, or Firm* — Charles L. Warner; Jason Bernstein; Bryan Cave LLP

(57) ABSTRACT

A method allowing the efficient conduction of highly exothermic, catalyst initiated reactions, particularly ones in which the product spectrum is highly dependant upon the temperature at which the process is conducted and to diffusional resistances within the catalyst particle matrix. The process occurs in a heat transfer device which consists of at least two channels which have at least one wall in common. Preferably two distinct sets of flow channels exist in which the process proceeds in one set of channels and heat transfer fluid passes through the second. The area of contact between the two sets of channels is sufficiently large to allow the efficient transfer of heat. These dimensions are controlled through the use of hollow catalyst particles through which the process gas can diffuse through either the inside or outside.

3 Claims, 6 Drawing Sheets

U.S. PATENT DOCUMENTS

| | | | |
|---|---|---|---|
| 3,875,678 A * | 4/1975 | Vits .................................. 34/478 |
| 3,907,710 A * | 9/1975 | Lundsager .................... 502/262 |
| 4,089,941 A | 5/1978 | Villemin |
| 4,124,357 A * | 11/1978 | Akimoto et al. .............. 422/181 |
| 4,140,467 A * | 2/1979 | Ellison et al. ................... 432/72 |
| 4,206,553 A * | 6/1980 | Ellison et al. ................... 34/502 |
| 4,346,753 A * | 8/1982 | Kletch .......................... 165/9.1 |
| 4,405,010 A * | 9/1983 | Schwartz ........................... 165/4 |
| 4,460,704 A | 7/1984 | Twigg |
| 4,509,010 A * | 4/1985 | Cedrone ....................... 324/750 |
| 4,509,584 A * | 4/1985 | Michalak et al. ............... 165/10 |
| 4,510,262 A * | 4/1985 | Kim et al. ..................... 502/304 |
| 4,510,263 A * | 4/1985 | Pereira et al. ................. 502/314 |
| 4,519,442 A * | 5/1985 | Barna et al. ................... 165/9.2 |
| 4,541,995 A * | 9/1985 | Kim et al. .................. 423/213.5 |
| 4,541,996 A * | 9/1985 | Pereira et al. ............. 423/213.5 |
| 4,599,481 A | 7/1986 | Post et al. |
| 4,637,993 A | 1/1987 | van Erp et al. |
| 4,749,724 A | 6/1988 | Quarderer et al. |
| 4,908,344 A * | 3/1990 | Pereira et al. ................. 502/313 |
| 4,942,676 A * | 7/1990 | Wimberger et al. ............ 34/558 |
| 5,036,032 A | 7/1991 | Iglesia et al. |
| 5,038,850 A * | 8/1991 | Choi ................................ 165/10 |
| 5,174,044 A * | 12/1992 | Jacobs et al. .................... 34/450 |
| 5,207,008 A * | 5/1993 | Wimberger et al. .............. 432/8 |
| 5,210,961 A * | 5/1993 | Jacobs et al. .................... 34/631 |
| 5,352,115 A * | 10/1994 | Klobucar ....................... 432/181 |
| 5,427,683 A * | 6/1995 | Gershon et al. ................ 210/264 |
| 5,441,097 A * | 8/1995 | Kanda et al. ..................... 165/10 |
| 5,531,593 A * | 7/1996 | Klobucar ....................... 432/181 |
| 5,707,299 A * | 1/1998 | McKenna ...................... 473/241 |
| 5,755,569 A * | 5/1998 | Berg et al. ..................... 432/181 |
| 6,211,255 B1 | 4/2001 | Schanke et al. |
| 6,302,188 B1 * | 10/2001 | Ruhl et al. ....................... 165/10 |
| 2004/0102530 A1 | 5/2004 | Borsa et al. |

* cited by examiner

METHOD FOR ENHANCING CATALYST SELECTIVITY

CROSS-REFERENCE TO RELATED APPLICATION

This application claims benefit of U.S. provisional patent application No. 60/779,079, filed Mar. 3, 2006, entitled METHOD TO ENHANCE CATALYST SELECTIVITY, and commonly assigned to the assignee of the present application, the disclosure of which is incorporated by reference in its entirety herein.

FIELD OF THE INVENTION

The current invention relates to a method of producing catalyst particles which offer minimal resistance to intra particle diffusion and to a chemical reactor for performing reactions utilizing such catalysts.

BACKGROUND OF THE INVENTION

Many chemical processes utilize catalytic material to enhance chemical conversion behavior. A catalyst promotes the rate of chemical conversion but does not effect the energy transformations which occur during the reaction. A catalytic chemical reactor therefore must have a facility for energy to flow into or be withdrawn from the chemical process. Often catalytic processes are conducted within tubes which are packed with a suitable catalytic substance. The process gas flows within the tube and contacts the catalytic packing where reaction proceeds. The tube is placed within a hot environment such as a furnace such that the energy for the process can be supplied through the tube wall via conduction. The mechanism for heat transfer with this arrangement is rather tortuous as heat must first be transferred through the outer boundary layer of the tube, conducted through the often heavy gauge wall of the tube and then pass through the inner boundary layer into the process gas. The process gas is raised in temperature and this energy can be utilized by the process for chemical reaction.

The process engineer is often caused to compromise between the pressure drop within the tube reactor with the overall heat transfer and catalytic effectiveness. The inner heat transfer coefficient can be effectively increased by raising the superficial velocity of the process gas. The higher gas velocity therefore improves the thermal effectiveness of the system. However, higher gas velocities increase the system's pressure drop and results in increased compressor sizes and associated operating costs. A reactor must be of sufficient length to allow a reaction to proceed to the required conversion. Utilizing high gas velocities typically results in reactors with large length to width ratios which again results in systems with high pressure drops. The smaller the characteristic dimension of the catalyst particle the higher is the utilization of the catalyst. This is sometimes expressed as a higher effectiveness factor. However, beds formed from small particles exhibit higher pressure drops than similar beds formed from larger particle. So an engineer designs a system with expectable compromises between heat transfer, catalyst utilization, system conversion, and pressure drop. Therefore a reactor for conducting catalytic processes which can promote overall heat transfer and levels of conversion whilst minimizing pressure drop is desired.

The selectivity of some catalytically enhanced chemical reactions is a function of the catalyst particle characteristic length. Such that utilizing large particles, which would reduce pressure drop, results in the formation of an undesirable product. An example of such a reaction is the Fischer Tropsch reaction in which hydrogen reacts with carbon monoxide to yield higher order hydrocarbons. In the Fischer Tropsch reaction the average molecular weight of the product is strongly dependant upon the hydrogen to carbon monoxide which contacts the mixture. Hydrogen has a much higher rate of diffusivity than carbon monoxide such that hydrogen can diffuse into the pores of a catalyst particle more rapidly than carbon monoxide. This can result in a gradient of the ratios of the reactants with the porous matrix. This can result in lighter products and sometimes methane being formed within the particle interior. This phenomenon becomes more prevalent as the catalyst characteristic length becomes larger.

A number of US Patents have been directed to methods of increased heat transfer within reactors and towards enhancing catalyst productivity and selectivity. U.S. Pat. No. 2,512,608 issued to F. J. Buchmann describes a technique in which active catalyst could be preferentially deposited upon the outer layers of alumina particles. The technique utilized the sputtering of iron directly onto the support. The resulting catalyst was claimed to be superior for Fischer Tropsch synthesis in terms of selectivity and catalyst attrition. However issues related to poor metals dispersion and pressure drop are not addresses.

U.S. Pat. No. 4,089,941 issued to B Villemin describes a method to improve the productivity of a nickel based steam reforming catalyst by utilizing structured cylindrical supports. The preferred support arrangement includes an alumina support in the shape of a cylinder containing at least four partitions located in radial planes in which the porosity is in the range 0.08 to 0.2 $cm^3/g$. It is preferred that the partition walls be separated by equal angles. It is claimed that the catalyst topology described results in an inexpensive catalyst which allows higher activity and a lower tendency to deactivate. The reason for the lower rates of deactivation is not given. It is also noted that such a catalyst design offers less resistance to flow and therefor, significantly reduces pressure drop through a packed tube. However, the patent does not teach of methods to adjust catalyst selectivity or methods to control heat transfer and does address the issues relating to the mechanical strength of the catalyst particles.

U.S. Pat. No. 4,599,481 issued to Post, et al. describes a process to produce a catalyst particle in which the active catalytic component is preferentially deposited the outer shell of the catalyst. This type of catalyst has been named egg shell or rim type catalyst. The patent teaches of a technique in which catalyst supports are first placed in a solvent for about 30 minutes. Water is used as an example, such that the solution essentially fills all of the pore volumes within the support. The wetted particle is then placed in a solution which contains a salt of the active catalytic component in solution for a controlled amount of time. The time is sufficient for the dissolved salt to contact the very outermost regions of the catalyst support. The particle is then dried, calcined and reduced as is frequently done in traditional catalyst preparation. The catalyst was used to synthesis higher hydrocarbons from carbon monoxide and hydrogen using the Fischer Tropsch synthesis. It was noted that a rim type catalyst produced appreciably less methane and a higher molecular weight product than a homogeneously impregnated catalyst particle. The technique was further refined and in the subsequent U.S. Pat. No. 4,637,993 again issued to Post et. al. In the second patent it was noted that further reduction of the rim area led to enhanced product distributions and defined a maximum thickness of catalyst impregnation. The technique maximizes productivity and allows large particles to be used which minimize pressure drop in packed columns. However the technique results in reactors in which large volumes of unused catalyst exist and also does not address the issues related to heat transfer.

G.B. Patent No. 2,366,611 issued to Symonds, describes a technique to produce a heat exchanger device. The heat exchanger is formed through the fusion of etched shims to form a structure with two distinct flow channels. The shims can be joined by brazing, welding or diffusion bonding. The patent describes how in certain applications one set of channels may be packed with a suitable catalyst and a reaction performed there. It is stated that this arrangement leads to better productivities than a packed tube in a shell and tube type heat exchanger. The patent does not teach of methods to enhance catalytic activity and selectivity or techniques to minimize reactor pressure drop.

U.S. Pat. No. 5,036,032 issued to Iglesia teaches of the importance of diffusional length scales to the product distribution of the Fischer Tropsch Synthesis. The patent describes a technique to selectivity coat the outermost region of a catalyst with the active salt such that the diffusion length scale can be decoupled from the particle length scale. The technique allows packed beds to be formed from large particles such that pressure drops are minimized. The catalyst support particle is contacted with a liquid molten salt. The molten salt contains the active metal precursor. It is found that depth of penetration can be controlled and predicted through careful choice of contact time. The resulting catalysts are shown to more active and have better selectivities to higher hydrocarbons that a uniformly impregnated catalyst of similar diameter. The patent does not teach of methods to utilise the majority of the catalyst particle or methods to control heat transfer.

U.S. Pat. No. 4,460,704 issued to M. Twigg teaches of a method to produce active catalyst particles which offer low pressure drops when packed in a bed. The technique involves the use of a non porous substrate onto which a catalytic coat is applied. The non porous substrate is in the form of hollow cylinders or hollow cylinders with partition walls in the radial plane. A sol-gel technique is used to apply a thin coat of gamma alumina catalyst coat which is impregnated with the active metal catalyst. The catalyst produced offered good activity with high catalyst utilization. It is thought that the thin catalyst offered a small diffusion resistance allowing a high effectiveness factor. The main advantage of the technique is that the catalyst formed offered significantly higher mechanical strength than a catalyst of similar shape formed through extrusion of the catalyst support only. However, the patent does not teach of methods to adjust catalyst selectivity or methods to control heat transfer.

U.S. Pat. No. 6,211,255 issued to Schanke, describes the suitability of a monolith based reactor system for the Ficher-Tropsch synthesis. The patent teaches that a monolith structure, consisting of essentially a number of straight edged parallel channels, can be coated with a catalytic coat. The thickness of the catalyst coat can be controlled to minimize diffusional resistance and maximize product selectivity. The straight nature of the channels leads to a low tortuosity and hence a low pressure drop. In one embodiment some of the channels are used to allow the passage of a heat transfer fluid to remove the heat of reaction. However the patent does not describe how the catalyst is replaced after deactivation or how the difficulties of manifolding are overcome.

It is therefore a feature of this invention to provide a technique in which catalysts are produce which offer high activity and selectivity whilst minimizing the pressure drop across a bed produced from such particles.

It is therefore a feature of the current invention to provide an improved chemical processor which is suitable for efficiently carrying out chemical reactions.

It is a further feature of this invention to provide a catalytic reactor which offers high rates of heat transfer between the process gas and heat transfer fluid even whilst utilizing low process gas velocities.

SUMMARY OF THE INVENTION

The invention comprises, in one form thereof, a chemical processing method allowing the efficient conduction of highly exothermic, catalyst initiated reactions, particularly ones in which the product spectrum is highly dependant upon the temperature at which the process is conducted and to diffusional resistances within the catalyst particle matrix. The process is conducted in a heat transfer device which consists of at least two channels which have at least one wall in common. Preferably two distinct sets of flow channels exist in which the process proceeds in one set of channels and heat transfer fluid passes through the second. The area of contact between the two sets of channels is sufficiently large to allow the efficient transfer of heat. The characteristic length of each channel is sufficiently small such that high rates of heat transfer can occur even with low superficial gas velocities. Such a design allows reactors with sufficiently high length to diameter ratios whilst still having modest overall lengths. The catalyst particles are designed to have small overall characteristic diffusional dimensions. These dimensions are controlled through the use of hollow catalyst particles through which the process gas can diffuse through either the inside or outside. The increased voidage of the catalyst bed combined with the low overall height and low gas velocity results in a packed bed with a low overall pressure drop.

More particularly, the invention comprises, in one form thereof, a plate type heat exchanger is used as a chemical reactor in which one set of channels are used for the process gas and one set of channels for the heat transfer fluid. The distance between the plates is chosen to be large enough to allow satisfactory introduction of the catalyst structures and achieve the required catalyst loading but not so large as to loose thermal performance. As the packing provides a sufficient disturbance to the flow it is not desirable to have flow disturbance structures embedded within the heat transfer plates. The heat transfer is achieved by having a temperature differential between the heat transfer fluid and process fluid. The heat transfer channel can be maintained at an isothermal temperature by controlling the pressure in the channel such that the boiling point of the heat transfer fluid is the temperature of the process. The energy is then removed as latent heat of vaporization.

BRIEF DESCRIPTION OF THE DRAWINGS

The above-mentioned and other features and advantages of this invention, and the manner of attaining them, will become apparent and be better understood by reference to the following description of several embodiments of the invention in conjunction with the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1B:
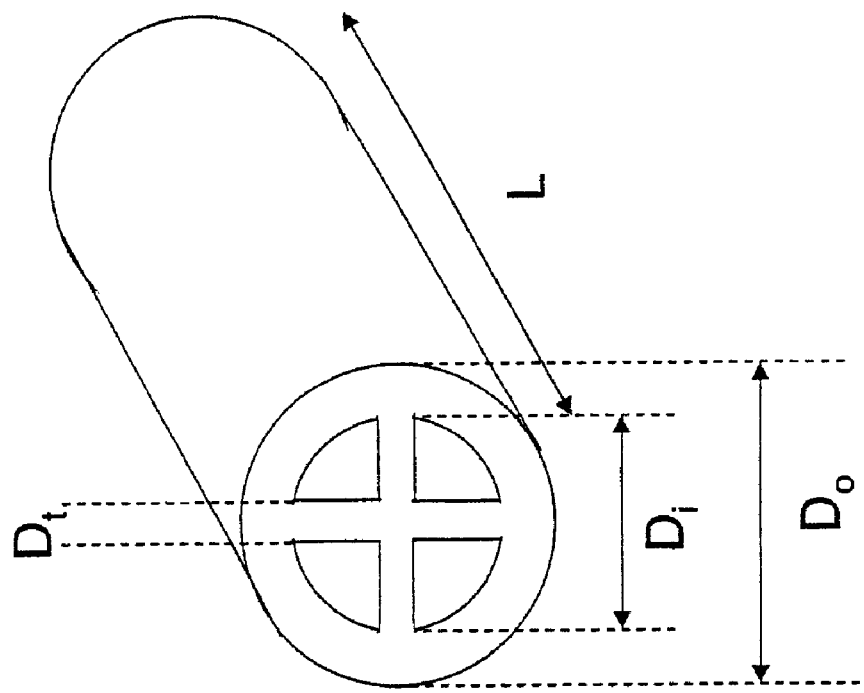
FIG. 1 is a cross-sectional schematic of a heat transfer device with one channel packed with hollow catalyst particles.

It is well known that when a catalyst particle exceeds a certain critical length its overall activity, expressed as mass of reactants converted per unit mass of catalyst, begins to diminish. This effect is sometimes expressed as an effectiveness factor. The reason for this reduction in activity is due to the reactants not being able to diffuse into the catalyst matrix sufficiently quickly, thus the process is said to become diffusion limited. In this case the interior of the catalyst particle does very little work as reactants cannot reach there unconverted. The Thiele modulus can be used to compare kinetic to diffusive timescales and can predict at what size a catalyst with a defined pore structure and tortuosity and with a known surface activity will become diffusional limited. Increasing the particle beyond this dimension will do little for time conversion behavior. However, it is often the case that catalyst particles beyond this dimension are often used and the inefficient use of catalytic material is deemed bearable. The reason for this mode of operation is that this critical dimension, especially for kinetically rapid reactions, is very small and much too small for practical applications. If a bed was formed from such small particles the pressure drop would be too large and the process would loose its economical attractiveness. To reduce the pressure drop to tolerable levels large catalyst particles are used and the loss of effectiveness is accepted.

However, for some reactions, a loss in product selectivity can occur if large particles are used. This is due to diffusional resistances having an effect on the ratio of the reactants inside the particle. This effect can be especially noticeable when hydrogen is one of the reactants as due to its small nature it has a larger coefficient of diffusion than other molecules. Two common reactions which exhibit this phenomenon are the Fischer-Tropsch Hydrocarbon Synthesis and the Fischer Tropsch Alcohol Synthesis, generically expressed as:

(1)

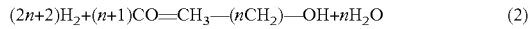(2)

For both reactions 1 and 2 the average value of n depends upon many factors including reactant ratio, system pressure, active catalytic site density within the catalyst, effective rate of diffusion within the catalyst, catalyst particle diameter and process temperature. Generally n decreases with an increase in the ratio of hydrogen to carbon monoxide, temperature or particle diameter and increases with an increase in system pressure.

When the characteristic length is increased beyond the critical dimension the ratio between hydrogen and carbon monoxide becomes a function of particle radius. Such that the ratio of hydrogen to carbon monoxide can change from the stoiciometrically desirable 2:1 to much higher values within the interior. The increase in this ratio will lead to a lighter average product and in the case of hydrocarbon synthesis will lead to high rates of methane formation. The length scale at which diffusion effects become noticeable depends upon the density of active sites with the catalyst and on the effective rate of diffusion with the catalyst but is generally found to be in the range 150 to 500 micron.

Figure 1A:
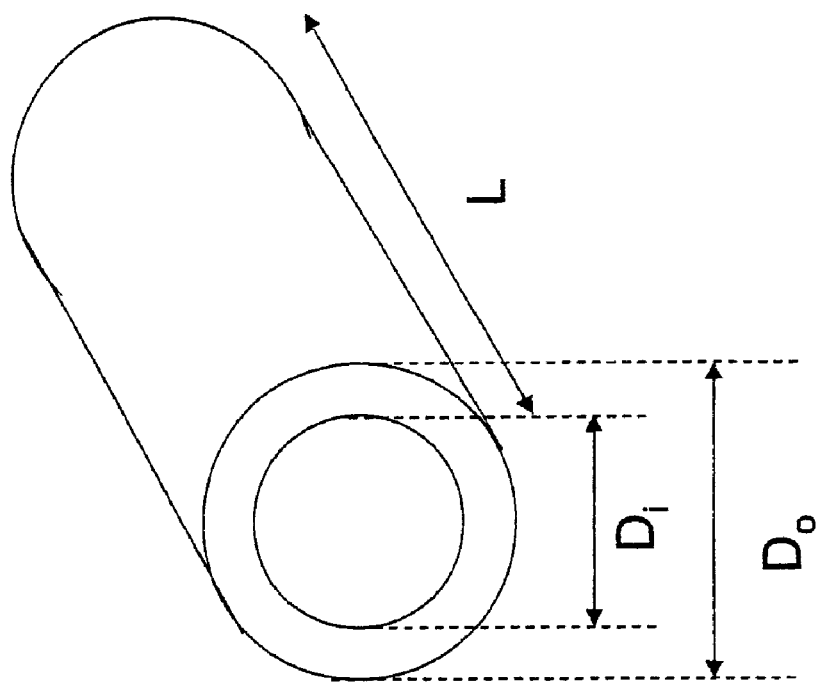
Figure 6:
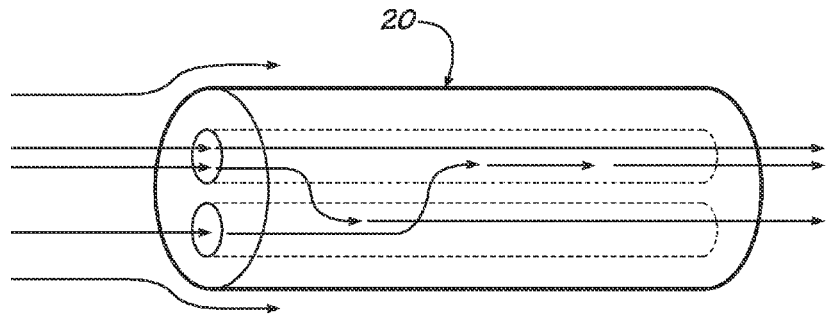
FIG. 6 is a perspective schematic view of a catalyst support particle showing two exemplary apertures and stream lines showing gas flow through and around the particle.

In the current invention this degradation in product selectivity is circumnavigated through the use of hollow particles such that the reactants have multiple directions in which they can enter the catalyst matrix (see FIG. 6). Some examples of suitable catalyst geometries are shown in FIGS. 1a and 1b. FIG. 1a portrays a hollow cylinder type catalyst. For this type of catalyst the characteristic diffusional length scale 'τ' may be defined as $$\tau = \frac{D_o - D_I}{4}.$$

Figure 2:
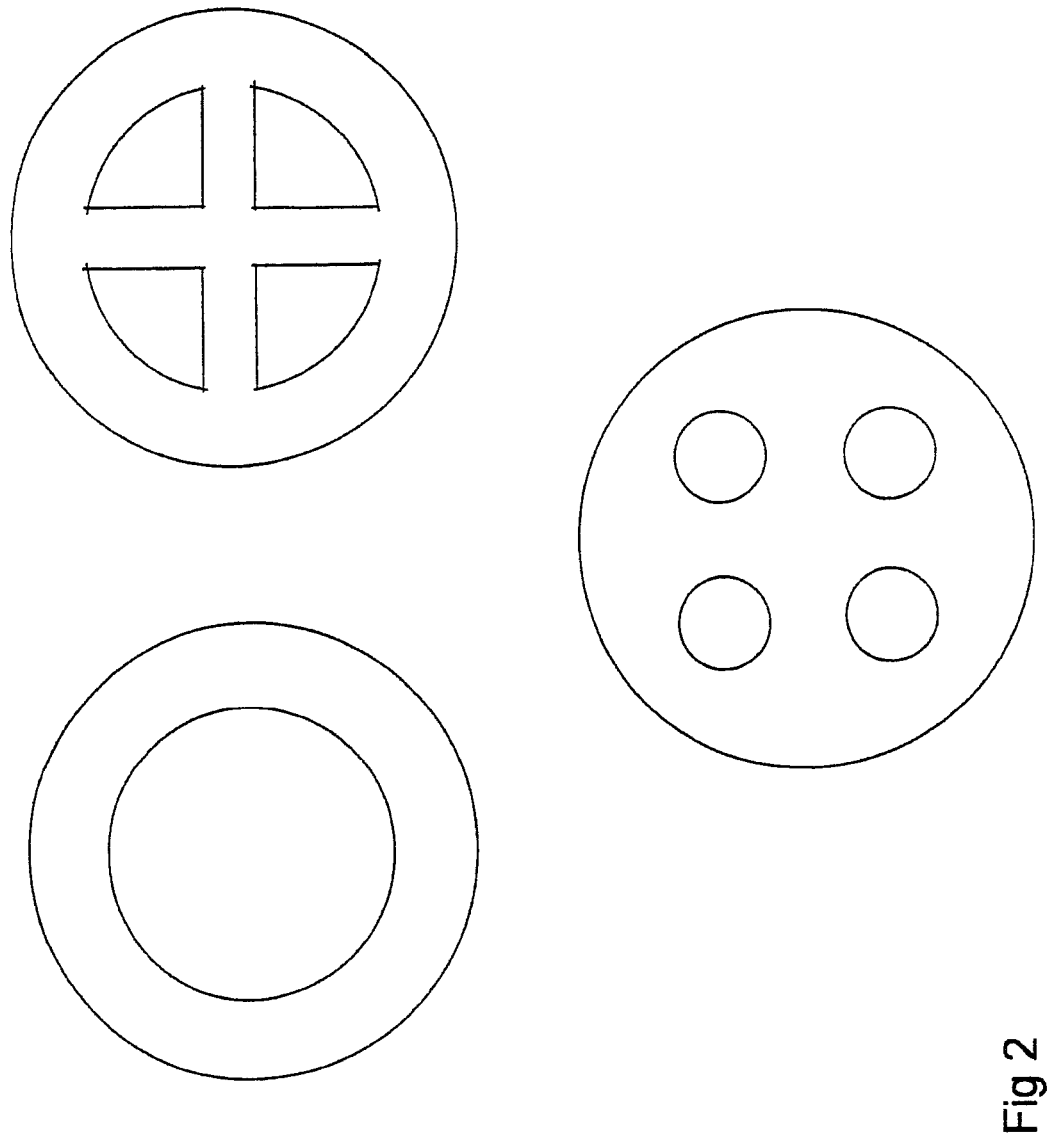
FIG. 2 is a schematic cross-sectional view of several exemplary embodiments of cross-sectional geometries of a hollow catalyst particle.

FIG. 1b portrays a hollow cylinder with partition walls in the radial plane. In this a second characteristic length scale '$D_c$' is also applicable. In one embodiment of the current invention it is desirable to use a catalyst particle with characteristic dimensions close to that at which diffusional effects are not important. This will ensure that the catalyst utilization is optimized and if applicable product selectivity is controlled. A second advantage of such a technique is that the contact surface area between the gas phase and the external surface of the particle is substantially increased. In many cases this will lead to substantially higher rates of chemical conversion than a catalyst of a solid cylinder shape. It is important that the central channel '$D_i$' is sufficiently large that gas can readily flow through that portion. Increasing the contact surface area in this manner also has dramatic effects on heat transfer. The central channel offers access to the interior of the particle allowing a second area for heat transfer. The reduction in characteristic length also minimizes any temperature gradient within the particle. An end view of some suitable catalyst support shapes is shown in FIG. 2. It is the intention of FIG. 2 to illustrate some simple geometries, all of which have smaller characteristic diffusion dimensions that a similar catalyst of the same external dimensions. The catalyst support material is generally an inorganic refractory oxide. Preferred supports include silica, magnesia, alumina, silica-alumina and titania. Preferred surface areas are in the range 50-500 m²/g. It is also important that the support has sufficient porosity to allow access of the interior of the particle as shown in FIG. 6).

The support can be impregnated with the active metal and any additives using a number of techniques well known in the art. The most common method being the incipient wetness technique. Here the catalyst support is contacted with a solution containing a salt of the catalytic metal. The solution enters the interior of the particle through the pores and the precursor salts become absorbed onto the pore walls. The two phases are contacted sufficient long for the fluid to flow through the entire matrix. The catalyst particle is then dried. In some preparation techniques the catalyst is calcined by slowly heating the particle to the desired temperatures. Sometimes a carrier gas is used to remove any vapors or products of thermal decomposition. Typically the active metal salt precursor decomposes to the metal oxide. The metal oxide is then reduced to the active metal by slowly heating the particle in a reducing atmosphere. Often hydrogen is used as the reducing component. Sometimes the reduction is performed at low temperature using reducing agents such as hydrazine. The resulting catalyst consists of finely dispersed metal crystallites supported by the porous refractory oxide. The size of the crystallites depends upon the metal loading, support characteristics and on the thermal cycles used for calcining and reduction.

Figure 3:
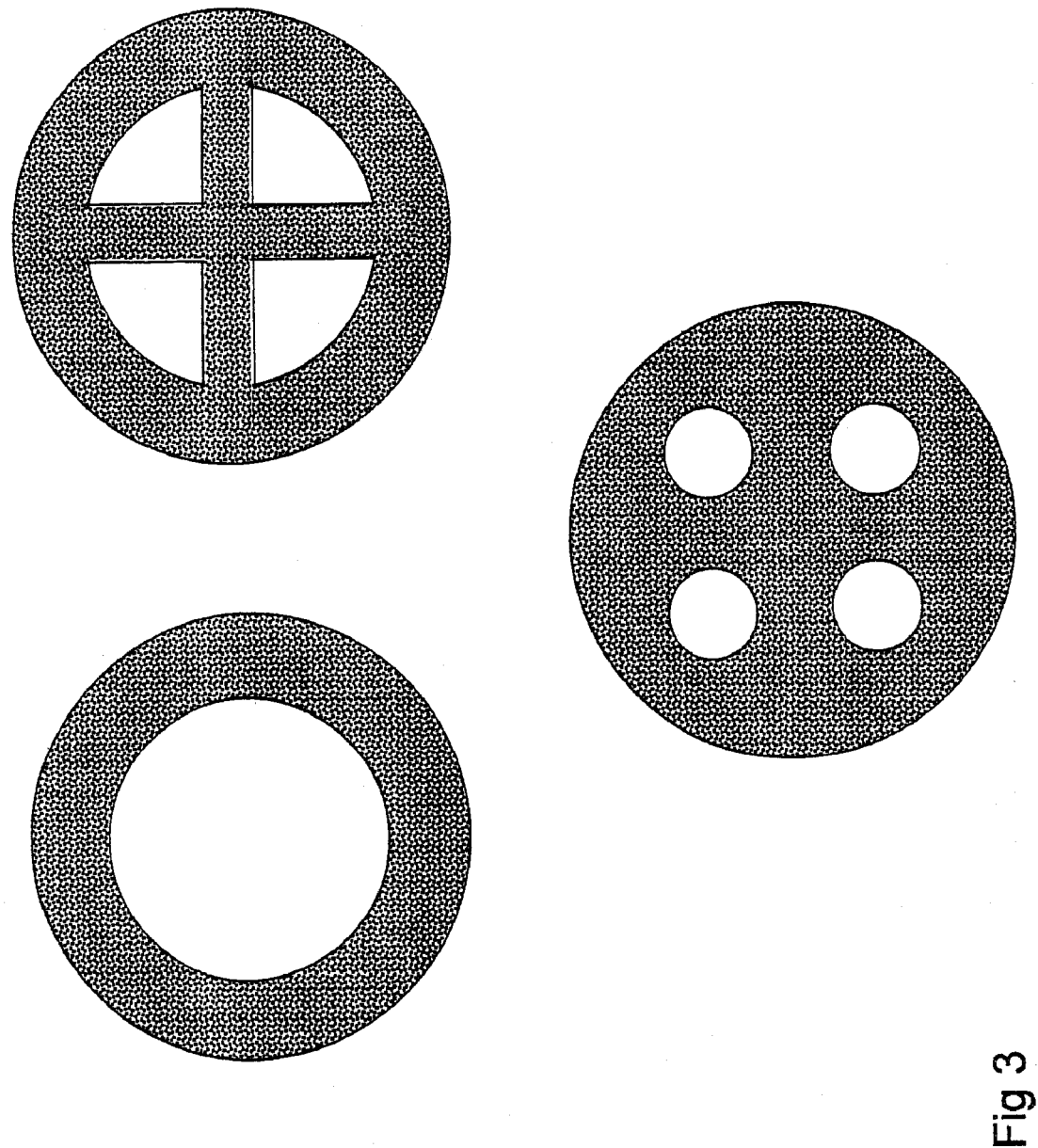
FIG. 3 is a schematic cross-sectional view of several exemplary embodiments of cross-sectional geometries of a hollow catalyst particle with stippling used to show one exemplary embodiment of catalyst component impregnation.
Figure 4:
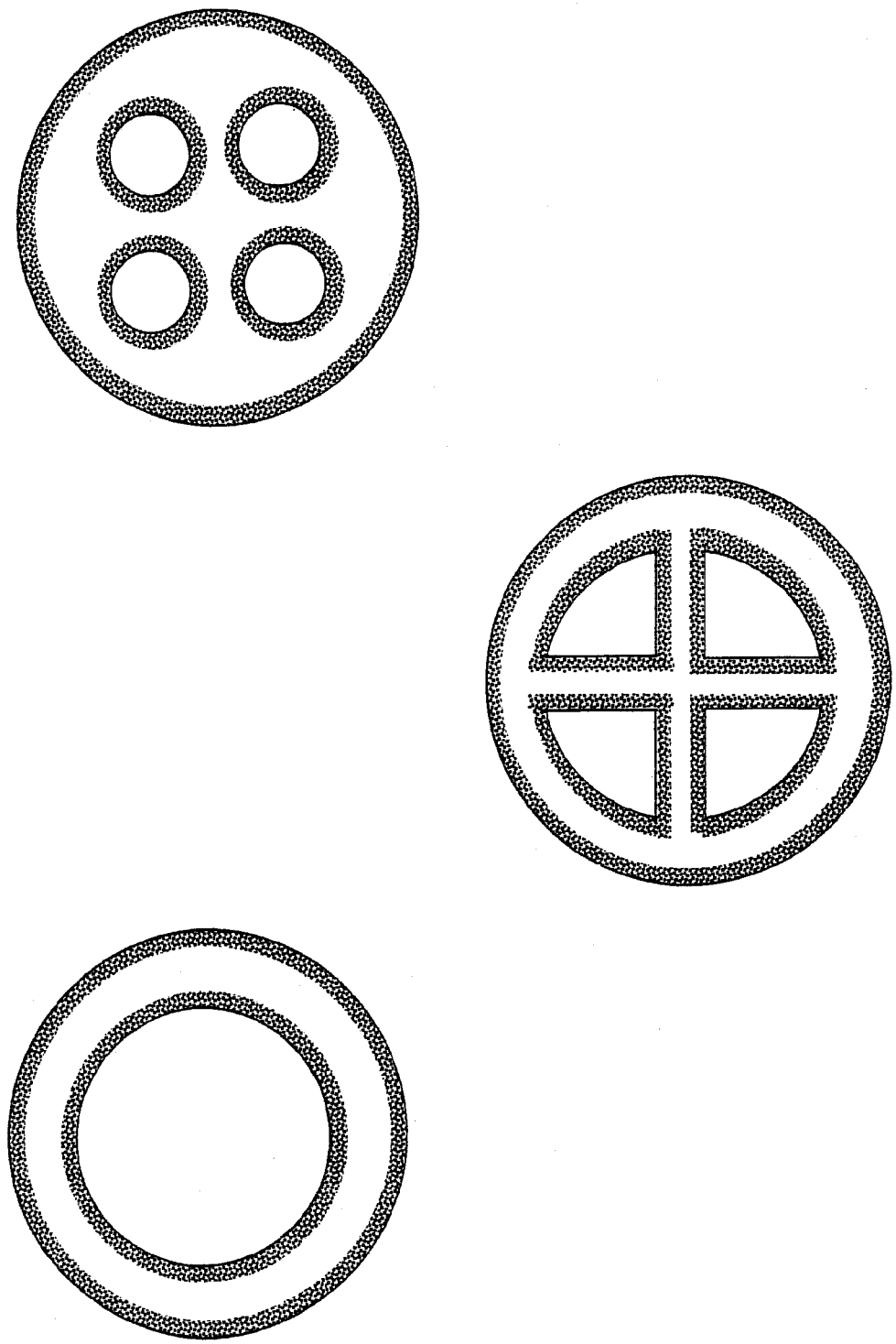
FIG. 4 is a schematic cross-sectional view of several exemplary embodiments of cross-sectional geometries of a hollow catalyst particle with stippling used to show a second exemplary embodiment of catalyst component impregnation through a selective portion of the particle wall.

In FIG. 3 some cross sections of uniformly impregnated particles are shown. The hashed area illustrates the area of impregnation. It is also possible that the current invention can be further enhanced by the careful selection of areas of impregnation. By careful choice of the viscosity and time of contact it is possible to preferentially impregnate the active metal close to the particle edge. Such impregnations are illustrated in FIG. 4. In this case a superior catalyst is produced than from solid catalyst topologies as the area of contact between the catalyst and gas phase is maximized.

Numerous catalyst particles can be used to form a packed bed and the reactants can be caused to flow through the bed. In this case a pressure drop will occur. Using hollow particles results in a significant smaller pressure drop than a bed of solid particles. This effect is further enhanced as the activity of each catalyst particle is higher and hence a shorter bed may be utilized. This saving can result in smaller ancillary equipment or it might be chose to reduce the size of the catalyst such the pressure drop is the same as for a bed of solid particles.

Figure 7:
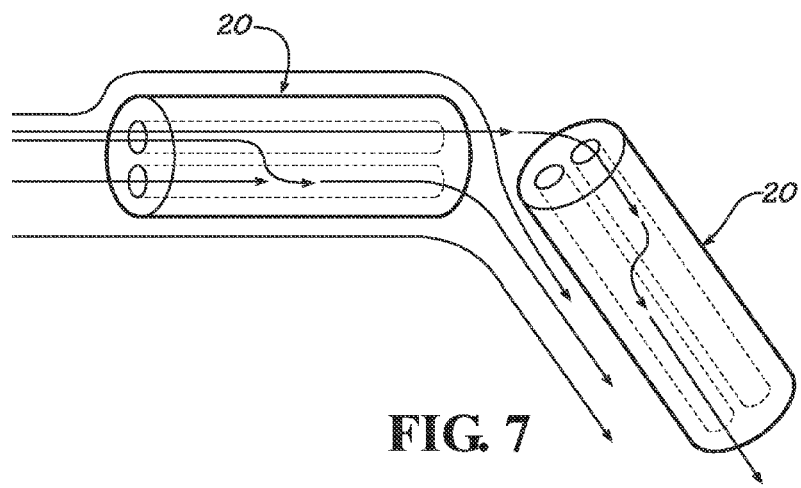
FIG. 7 is a perspective schematic view of two catalyst support particles showing exemplary apertures and stream lines showing gas flow through and around the particles.
Figure 8:
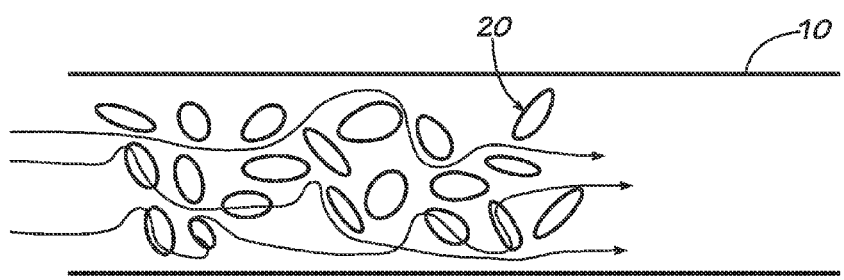
FIG. 8 is a side schematic view of an exemplary embodiment of a reaction bed comprising a tube containing a plurality of catalyst support particles in random orientation and stream lines showing tortuous path of gas flow.

In a preferred embodiment the catalyst particles are used in conjunction with a heat transfer device. The heat transfer device may be a heat exchanger including but not limited to shell and tube devices or stacked plate device. The process may be formed by a number of adaiabatic packed beds with interstage heat transfer. It is particularly desirable to utilise the catalyst particles in a plate type heat exchangers. It is well known that these units exhibit higher rates of heat transfer which are amongst the highest for all common heat transfer devices. As the heat transfer path length is short it allows the efficient heat exchanger between the process gas and heat transfer surface. The heat transfer is substantially increased by the presence of the catalyst particles which cause the gas to take a tortuous path through the bed (as shown in FIGS. 6-8). This avoids the need for flow disturbance elements which are sometimes attached onto the plates of some plate heat exchangers. The plate heat exchanger can be made from a number of materials including metals. The plates may be welded, brazed, diffusion bonded or gasketed to make a suitable seal between adjacent channels and to the prevent leaks.

Figure 5:
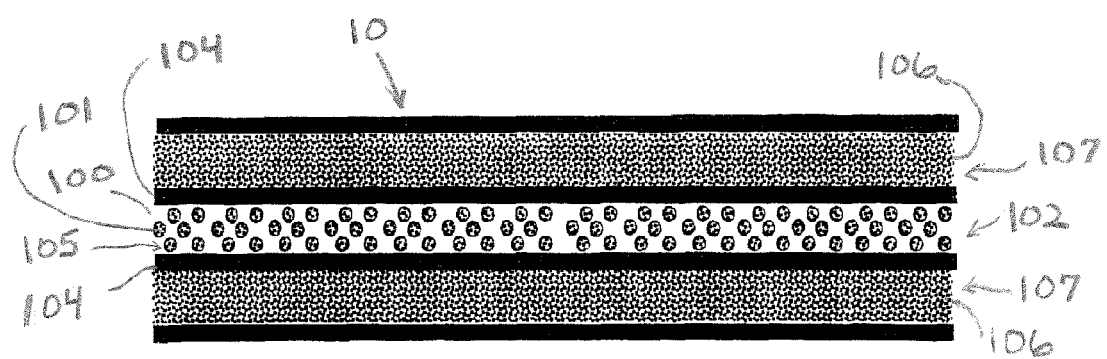
FIG. 5 is a schematic cross-sectional side view of one exemplary embodiment of a process channel reactor.

FIG. 5 is a cross section of a one process channel reactor 10. Process enters through the inlet (100) into the packed channel 105. The width of channel 105 is chosen to be small. The gas contacts the hollow catalyst cylinders 101 and reaction occurs. If the product is a liquid it will trickle down the vertical channel until it reaches the exit 102 along with any unreacted gas or gaseous products. The heat generated during the process is conducted through dividing walls 104 into the adjacent heat transfer channel 103. Heat transfer fluid enters the channel 103 at a temperature just below its boiling point. The pressure in the channel can be used to control the temperature at which the liquid boils. The energy transferred through the separating wall 104 causes the liquid to boil and the heat is absorbed as heat of vaporization. A two phase flow exits through 107.

Example 1

In this example, reaction 3 is the Fischer Tropsch Hydrocarbon Synthesis:

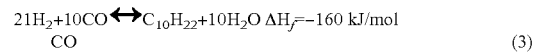

$$21H_2 + 10CO \leftrightarrow C_{10}H_{22} + 10H_2O \quad \Delta H_r = -160 \text{ kJ/mol CO} \qquad (3)$$

The heat of reaction in equation 3 equates to a product of a product with an average chain length of 10. Here the reaction is conducted in the reactor illustrated in FIG. 4. Hydrogen and carbon monoxide enter the plate heat exchanger where they contact a suitably impregnated catalyst. The catalyst chosen is a hollow cylinder such that the reactants can readily diffuse into the interior of the particle from both sides. This results in a higher activity and with minimal methane and other byproduct formation. The process conditions are chosen such that the average product composition corresponds to a light middle distillate. The large exotherm causes the process gas temperature to increase. This increase causes a temperature differential between the process gas and the heat transfer fluid. This differential causes energy to flow between the two channels. The heat transfer in the system is superior to a conventional packed column as the surface area between the catalyst and process gas is greatly enlarged. The high rates of heat transfer result in a small temperature differential between the two channels. The reactor length can be sized such that the desired level of conversion has occurred before the gas exits the channel. As relatively low gas velocities can be used whilst still achieving the required rate of heat transfer the reactor height is small and much smaller than conventional Fischer Tropsch reactors.

Example 2

In this example, reaction 4 expresses methanol synthesis from syngas.

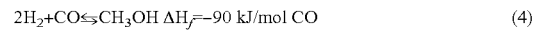

$$2H_2 + CO \leftrightarrow CH_3OH \quad \Delta H_r = -90 \text{ kJ/mol CO} \qquad (4)$$

Here the reaction is conducted in the reactor illustrated in FIG. 5. Hydrogen and carbon monoxide enter the plate heat exchanger where they contact a suitably impregnated catalyst. The catalyst chosen is a hollow cylinder such that the reactants can readily diffuse into the interior of the particle from both sides. The arrangement results in higher effectiveness factors and better catalyst utilization than a catalyst with the same external dimensions which is not hollow.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims. All patents, applications and publications referred to herein are incorporated by reference in their entirety.

The invention claimed is:

1. A method of forming a catalyst reactor having a small pressure drop when reactants flow through a catalyst bed present in said catalyst reactor, the method comprising:
   a) providing a plurality of porous solid catalyst support particles, each catalyst support particle having an exterior surface and having at least one aperture defined therein through which a process gas can pass and in which said process gas entering said aperture can diffuse at least partially into said catalyst support particle, said aperture having a wall defining an interior surface, said catalyst support particle having a surface area in the range of about 50 to about 500 $m^2/g$;
   b) impregnating at least a portion of each said catalyst support particle with a catalytically active component such that said component is impregnated at least partially into the exterior surface of said catalyst support particle and impregnated at least partially into said interior surface of said catalyst support particle to form a plurality of impregnated catalyst support particles having an impregnated catalytic component;
   c) activating said impregnated catalytic component to form impregnated, activated catalyst support particles;
   d) inserting a plurality of said impregnated, activated catalyst support particles into said catalyst reactor to form a packed catalyst bed; and
   (e) providing a plurality of channels through said catalyst reactor, wherein said impregnated, activated catalyst support particles are inserted into at least one, but not all, of said channels, wherein heat can diffuse from one channel to another channel, and wherein the length for heat transfer within a channel is in the range of about 0.1 mm to about 200 mm;
   whereby process gas entering said catalyst reactor flows in a tortuous path therein, namely, around at least some of said impregnated, activated catalyst support particles, and into said aperture of at least some of said catalyst support particles.

2. The method of claim 1 wherein providing a plurality of porous solid catalyst support particles comprises providing porous solid catalyst support particles having a diffusion length of approximately 0.1 mm.

3. The method of claim 1 wherein activating said impregnated catalytic component comprises at least one of: heating the impregnated catalyst support particle in a reducing atmosphere, heating the impregnated catalyst support particle in a reducing atmosphere using hydrogen as the reducing component, reducing said impregnated catalytic component, or reducing said impregnated catalytic component using hydrazine as the reducing component.

* * * * *